United States Patent
Steinich

(10) Patent No.: US 8,803,512 B2
(45) Date of Patent: Aug. 12, 2014

(54) METHOD OF USING A BAND SENSOR FOR DETERMINING A POSITION OF A COMPONENT INSIDE A HOUSING

(75) Inventor: Klaus Manfred Steinich, Zorneding (DE)

(73) Assignee: ASM Automation Sensorik Messtechnik GmbH, Moosinning (DE)

( * ) Notice: Subject to any disclaimer, the term of this patent is extended or adjusted under 35 U.S.C. 154(b) by 988 days.

(21) Appl. No.: 12/804,206

(22) Filed: Jul. 16, 2010

(65) Prior Publication Data
US 2011/0067565 A1    Mar. 24, 2011

(30) Foreign Application Priority Data

Sep. 22, 2009  (DE) .......................... 10 2009 042 506

(51) Int. Cl.
*G01B 7/14*   (2006.01)
*G01D 5/14*   (2006.01)

(52) U.S. Cl.
CPC ..................................... *G01D 5/145* (2013.01)
USPC ................................................... 324/207.24

(58) Field of Classification Search
USPC ..................................................... 324/207.24
See application file for complete search history.

(56) References Cited

U.S. PATENT DOCUMENTS

| | | | |
|---|---|---|---|
| 6,353,314 B1* | 3/2002 | Moerbe | 324/207.22 |
| 7,427,860 B2* | 9/2008 | Saito et al. | 324/207.25 |
| 7,855,552 B2* | 12/2010 | Steinich | 324/207.25 |
| 8,183,855 B2* | 5/2012 | Hornung et al. | 324/207.11 |
| 2009/0027044 A1* | 1/2009 | Hornung et al. | 324/207.2 |

FOREIGN PATENT DOCUMENTS

DE    19947370    5/2001

* cited by examiner

*Primary Examiner* — Jay Patidar
(74) *Attorney, Agent, or Firm* — Head, Johnson & Kachigian, P.C.

(57) ABSTRACT

A method for using a band sensor for defining a position of a component in an interior of the housing. At least one magnet is coupled with a winding drum of the band sensor so the magnet is drivable in rotation about a magnetic rotation axis wherein a pole axis is disposed transverse to the magnetic rotation axis. The measuring band length varies with percentage of wind-up which is numerically compensated by processing electronics.

29 Claims, 13 Drawing Sheets

METHOD OF USING A BAND SENSOR FOR DETERMINING A POSITION OF A COMPONENT INSIDE A HOUSING

CROSS-REFERENCE TO RELATED APPLICATIONS

This application claims priority to German Patent Application No. 10 2009 042 506.3 filed Sep. 22, 2009.

FIELD OF THE INVENTION

In piston accumulators, in which a piston has to be supported tightly sealing and movable in longitudinal direction, a current position of the piston in a cylinder has to be monitored frequently.

The same applies for a position of a float sensing a filling level of a fluid container.

BACKGROUND OF THE INVENTION

This can be achieved through separate external measuring devices. However, for reasons of cost for manufacture and assembly, and also for better protection against mechanical damages, it is typically more advantageous to dispose the required position sensor for the piston in the interior of the piston accumulator, so it is protected.

This causes a variety of problems.

On the one hand side, such position sensors are often operated electrically or at least analyzed electrically, regard less of their functional principle, so that a supply and return of electric power and/or data in electrical form has to be performed into and out of the interior of the piston accumulator, which as a matter of principle provides a source for leaks, in particular when the sensor is disposed in the pressure loaded portion of the piston accumulator.

Quite frequently, a measuring cable travel distance sensor was used as a sensor, wherein a measuring cable is wound onto a cable drum that is preloaded by a spring in windup direction.

When a measuring cable sensor of this type is attached at a face of a piston accumulator and a loose end of a measuring cable is attached to a piston, a position of the piston in a cylinder can be detected by detecting rotations of a cable drum.

In this context, it is already known from EP 1979716 to connect one or plural encoder magnets with the cable drum torque proof, and to dispose a measuring cable sensor of this type, thus without an electrical supply, as a purely mechanical component completely encapsulated in the interior of the piston accumulator.

The rotations of the one or plural encoder magnets co-rotating with the cable drum are sensed by an angle sensor that is sensitive to magnetic fields from outside of the cylinder through the pressure tight wall of the cylinder and the piston position is determined there from.

Thus, the pressure tightness of the cylinder is maintained.

For the wall of the cylinder, it is stated that it is required that it is made from a non-magnetizable material in the portion of the detection of the encoder magnet. Also, this solution, however, has disadvantages in turn:

When the measuring cable sensor is installed with the rotation axis of the cable drum transversal to the movement direction of the piston in the cylinder, the windup point of the cable drum moves back and forth in longitudinal direction of the cable drum, thus transversal to the movement direction of the piston during windup, which is performed only in one layer for measuring cable sensors.

Since the piston is very close to the measuring cable sensor when the piston has moved proximal to the sensor, these are angular amounts which cannot be neglected anymore and which falsify the measuring results.

Additionally, there is in principle the risk that the cable jumps and that the cable drum is wound up in several layers, which also leads to a substantial falsification of the measuring result which is not detected from the outside, and the cable is then also highly loaded mechanically when being wound up at the sides of the cable drum.

In order to prevent this, complex additional measures for correct cable support are required.

However, when the measuring cable sensor is mounted with the rotation axis of the cable drum parallel to the movement direction of the piston, the measuring cable has to be deflected at least once from the unwinding direction into the movement direction of the piston, which leads to a significant reduction of the service life of the measuring cables, though the long but not unlimited service life of a measuring cable of a measuring cable sensor already constitutes a disadvantage in principle of installing measuring cable sensors at a position of this type, which is accessible only with difficulties, wherein the complexity of disassembling and replacing the measuring cable sensor in this position is extremely high.

DESCRIPTION OF THE INVENTION a) Technical Object

Thus, it is the object of the invention to perform the position measurement of a piston in a piston accumulator or container, so that the service life and the measurement precision are optimal with low complexity and cost.

b) Solution

By using a measuring band sensor instead of a measuring cable sensor in the interior of a piston accumulator for determining a piston position, several problems are being solved simultaneously.

On the one hand side, the unwinding location of the measuring band does not move in the direction of the rotation axis of the winding drum during unwinding, so that neither the risk of uncontrolled jumping, like when the measuring cable has to be wound next to itself, nor the mechanical loading of the side edges of the measuring element occurs like it occurs for the measuring cable.

The alleged disadvantage that a rotation of a winding drum does not always correspond to the same measuring cable length, when a measuring cable is wound in a radial plane, but that this measuring cable length varies with the percentage of windup can be numerically compensated by the processing electronics, so that this does not cause a disadvantage in practical applications.

Also the fact that the band length per revolution changes as a function of the changing preload of the measuring band and of the other environmental conditions in the respective application can be eliminated by determining the actual measuring lengths after the assembly of the band sensor through a teaching method, in that the band sensor is completely pulled off at least once and the measured distance of the free end of the measurement band is exactly measured by the winding drum and correlated with the rotation value of the winding drum.

This is also additionally performed for some pull off lengths located there between. Typically, this can be performed in a quick and cost effective manner when the sensor is produced thus before delivery by using a respective device.

In case one wishes to avoid a change of the pull off angle for a measuring cable sensor which only occurs when the winding axis is oriented transversal to the movement direction of the piston, the winding drum has to be mounted with its rotation axis parallel to the movement direction of the piston.

This, however, then necessitates a deflection of the measurement cable, e.g. through a pulley which however is known to be quite detrimental for the service life of any measuring cable.

In practical applications this means that measuring cable sensors thus installed never reach the service life of the respective piston accumulator, but have to be replaced before at least once possibly several times.

However, since the measurement cable sensor is often disposed in the pressure loaded portion of the piston sensor, such exchange means bleeding the pressure and thus typically means shutting down not only the respective piston accumulator but a much more comprehensive pressure loop or pressure portion with the subsequent problems of correct sealing the pressure loop, refilling the pressure loop, possibly bleeding the pressure loop, so that the disassembly and assembly effort for changing the measurement cable sensor at this location was mostly much higher than the purchase price of the measurement cable sensor itself.

These problems are solved by using a band sensor since the measurement band as a matter of principle has a higher service life than a measurement cable and even when the measurement band is deflected, the deflection of the measurement band contrary to a measuring cable has hardly any detrimental effect on the service life of the measurement band.

Thus the band sensors can very well reach the service life of the piston accumulator itself, so that a disassembly and assembly of a new band sensor can often be completely avoided.

Furthermore the teaching method which is detrimental at first glance since it is necessary, has an additional advantage for the correct startup of the band sensor or at least doesn't have any disadvantage.

The teach-in method simultaneously also eliminates specific production deviations of the respective band sensor and other specific parameters which is not possible without performing a teach-in method which is not achieved for measurement cable sensors either.

If one were to achieve the same effect also for measurement cable sensors, a teach-in method would also be possible for them.

Even when the travel of the piston that has to be detected is very small, preferably the diameter of the winding drum for the measurement band is selected as big as possible, thus large enough, so that it still fits into the interior of the piston accumulator by a narrow margin.

The larger the winding drum, the smaller the bending of the measurement band during windup and the bigger its service life.

Since e.g. when mounting the winding drum with its rotation axis transversal to the movement direction of the piston, the width of the measurement band can then be selected rather large, the measurement band can be sized relatively thin in spite of a predetermined service life since both factors, width and thickness of the measurement band together influence the service life of the measurement band besides other factors like degree of bending etc. Thus, for the same cross sectional surface, the service life of the measuring band is significantly higher than the service life of a measuring cable.

When the band sensor can only be disposed with its rotation axis parallel to the movement direction of the piston for particular reasons, thus, in particular disposed coaxial thereto, this is also non-critical, since the deflection of the band sensor through a pulley hardly influences the service life of the measurement band at all.

Thus, since the portion of the band sensor that is disposed in the interior of the piston accumulator is an exclusively mechanical component, due to the preloading of the winding drum in windup direction through an installed flat spiral spring, this portion of the band sensor can also be disposed without problems in the pressure loaded portion of the interior of the piston accumulator, since it does not include any electrical or electronic components, which can be destroyed by the pressure, and does not require a supply of cables or electrical conductors which cause leaks in the cable passthrough.

The at least one encoder magnet coupled torque proof with the winding drum and disposed eccentrically to the rotation axis, is disposed as close as possible to the inside of an outer wall of the piston accumulator, either the enveloping surface or the face, which is preferably made from non-magnetizable material in this wall portion, and its rotation position is scanned contact free through a respective angle sensor, wherein the angle sensor can then certainly be supplied with electricity without any problems, and can be provided with electronic processing.

The wall portion that is permeable for the magnetic field, however, can also be made from magnetizable material, as long as a saturation of the magnetization of the wall portion is provided, which can then also be detected by a magnetic field sensitive angle sensor outside of the housing. Thus, the wall portion can be made e.g. from stainless steel.

Since this wall portion, however, may only have a limited thickness, simultaneously, however, the pressure resistance of the piston accumulator shall be maintained, it is important that this wall portion with its small wall thickness is provided with the smallest surface area possible, preferably in this case below 2 cm$^2$, better below 1 cm$^2$ This is accomplished in that the magnetic field sensitive angle sensor scanning from the outside is provided with the smallest surface area possible, which is facilitated by providing it as a chip, which is disposed exactly positioned at the outside of the piston accumulator in this wall portion.

The magnetic field permeable wall portion can be an integral portion of the wall, in particular integrally configured with the wall, or it can be welded in as a window. In a preferred embodiment, however, this wall portion is disposed in a replaceable insert component, in particular in a screw-in component, which can e.g. have the shape of a blind hole bushing, wherein the insertable component can be threaded through a standard thread into a respective threaded bore hole of the wall of the piston accumulator, in particular of the face wall, and can be sealed through typical measures like O-ring seals.

This has the advantage that the screw-in component can be separately produced, and thus also the small wall thickness in the magnetic field permeable wall portion, in this case preferably the face portion of the blind hole shaped- or pot shaped screw-in component can be produced quite precisely.

Furthermore, the pot shape of the screw-in component has the advantage that the blind hole, when it is disposed on an outside of the screw-in component, can be sized so that a pin-shaped rotation angle sensor is insertable form fitted, which includes the magnetic field sensitive angle sensor at the correct location, e.g. at a front face.

This solves the problem of exactly positioning the angle sensor in a simple manner.

In order to be able to use a magnetic field sensitive angle sensor, whose measurement range is slightly less than a full revolution, the magnet that is coupled in rotation with the winding drum is not synchronously driven by the winding drum, but a magnet step down transmission is disposed there between, which reduces the rotation angle of the magnet to the measuring range of the angle sensor, thus preferably to slightly less than one full revolution for a full pullout of the measuring band.

In order to keep the flat spiral spring small, which preloads the winding drum into the windup direction, preferably also the rotation of the flat spiral spring is stepped down through a spring step down transmission relative to the speed of rotation of the winding drum.

Thus, the spring step down transmission and the magnet step down transmission can be partially identical with one another, in particular when they are geared transmissions.

All statements supra apply accordingly also for a measuring band sensor as it is being disposed for determining the position of a float in the interior of a container for bulk materials or liquids in order to detect their filling levels.

BRIEF DESCRIPTION OF THE DRAWINGS:

Embodiments according to the invention are subsequently described in an exemplary manner with reference to drawing figures, wherein.

DETAILED DESCRIPTION OF THE PREFERRED EMBODIMENTS OF THE INVENTION

Figure 2A:
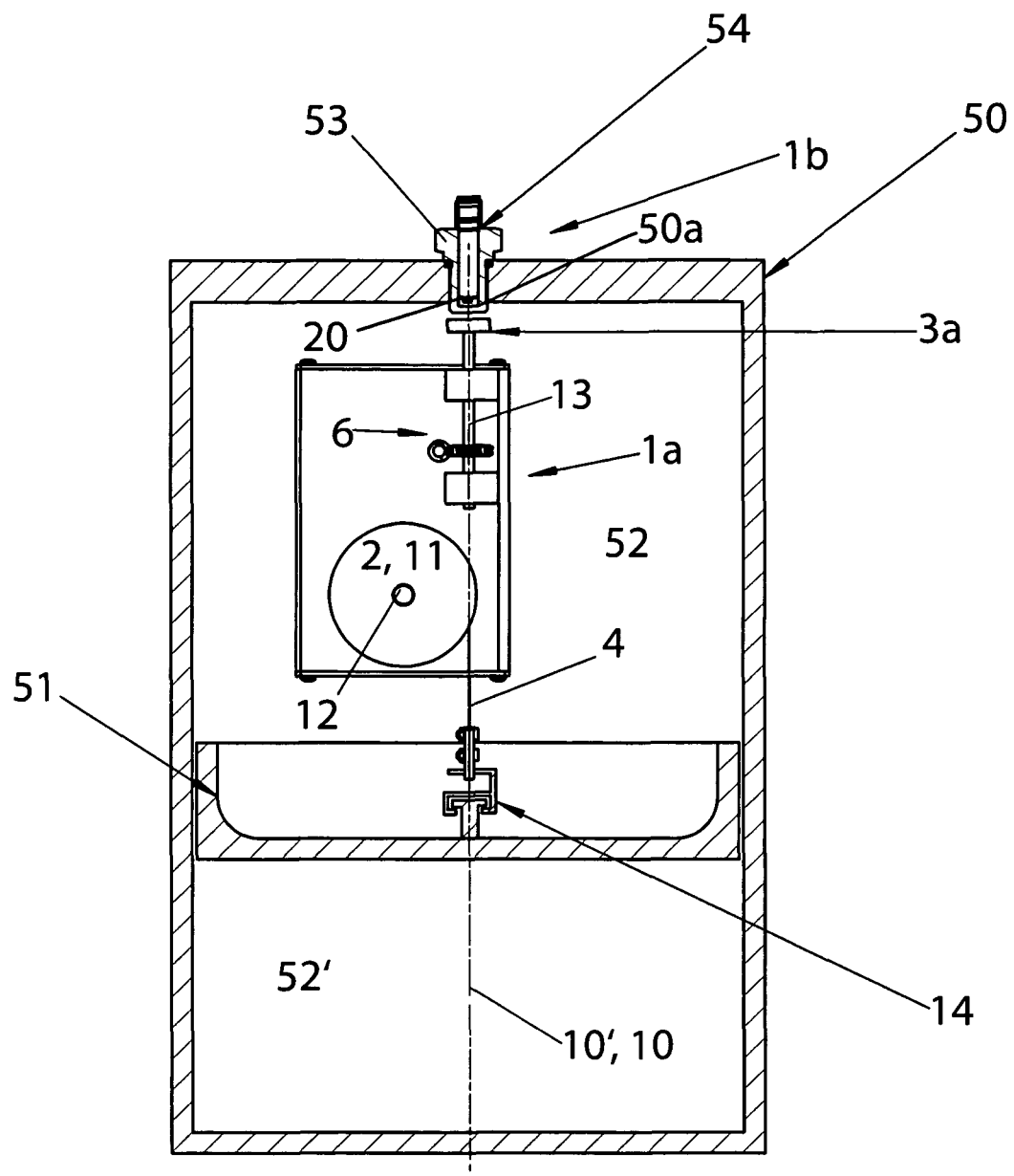
FIG. 2a illustrates a piston accumulator with a magnet step down transmission.
Figure 2B:
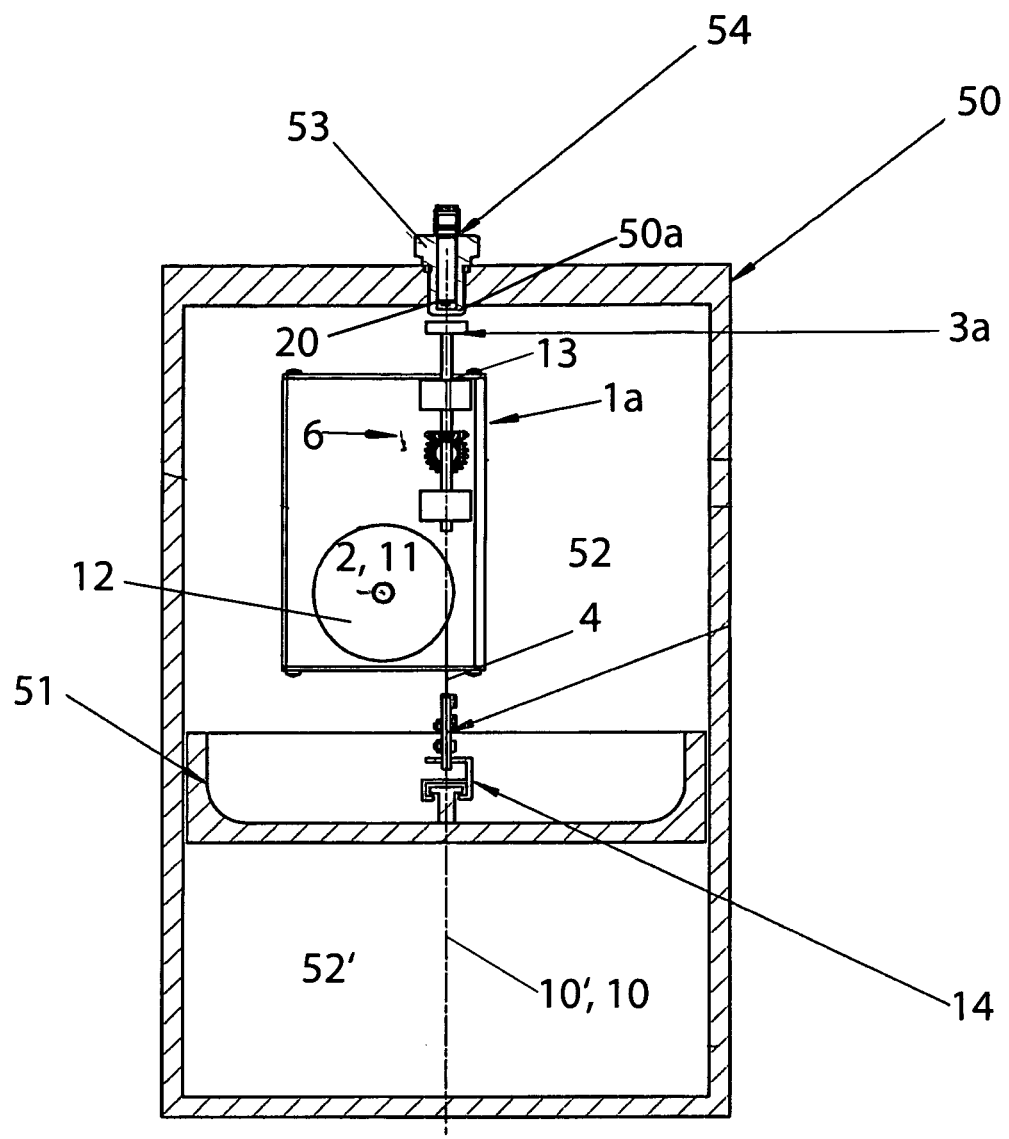
FIG. 2b illustrates a piston accumulator with a bevel gear transmission.

FIG. 2 illustrates a piston accumulator 50, in which a piston 51 is movable in longitudinal direction 10, and thus provides one respective inner cavity 52, 52' on both sides of the piston 51, wherein one of the two inner cavities is typically filled with a gas and the other one is filled with a liquid, and the compression of the gas, which increases with increasing pressure, is used for storing energy. The inlets and outlets necessary in the accumulator necessary for this purpose are only indicated in FIG. 2b for reasons of clarity.

In order to exactly know the energy content in the piston accumulator 50 at any point in time, the position of the piston 51 is detected through the band sensor 1, whose mechanical portion 1a is disposed in the interior 52 of the piston accumulator 50, while the electrical portion 1b is disposed as a rotation angle sensor 54 with an angle sensor 20 outside of the inner cavity 52 and thus outside of the pressure loading.

Figure 1:
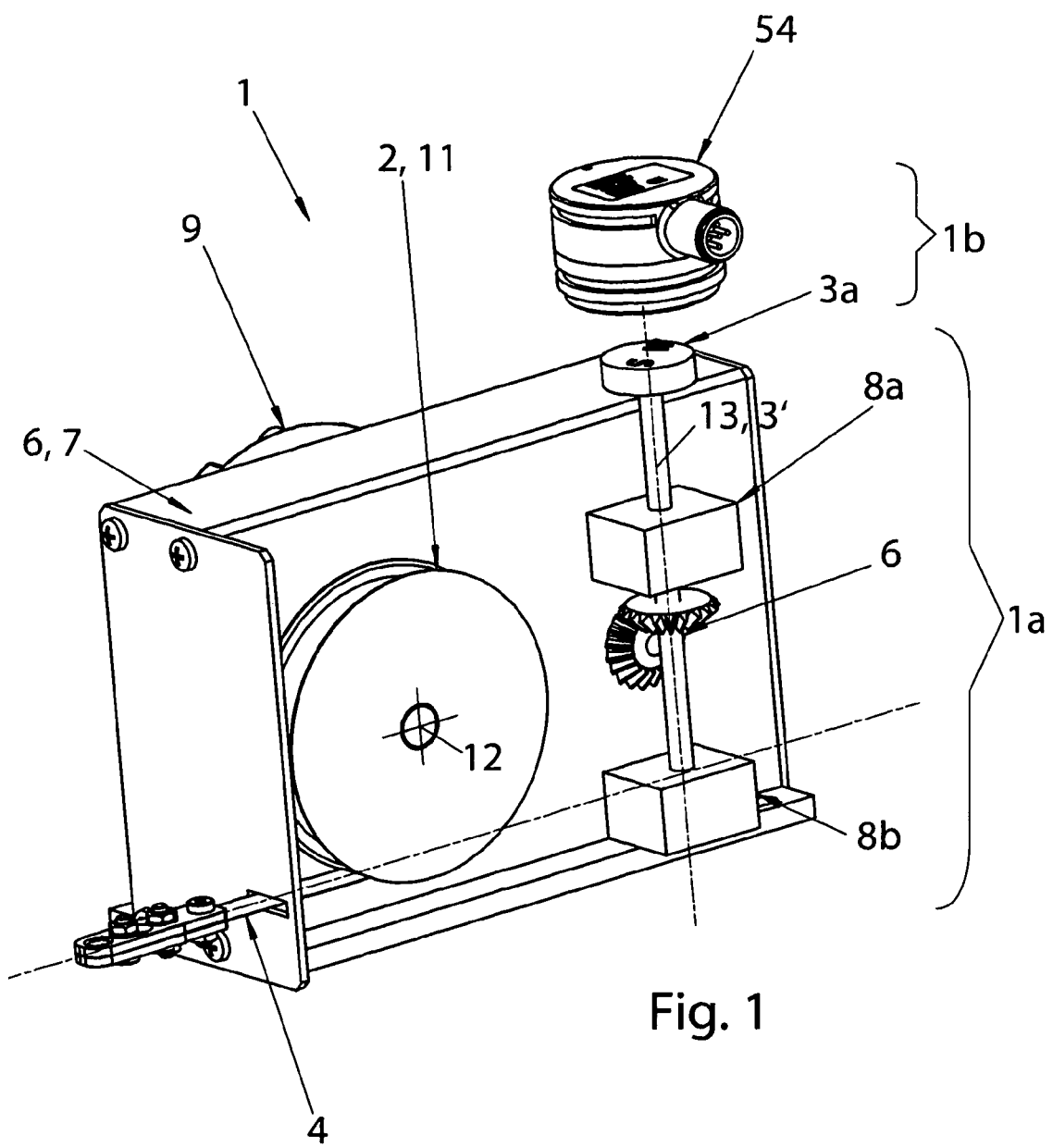
FIG. 1 illustrates a band sensor with contactless mechanical transmission.

The band sensor 1 is illustrated by itself in FIG. 1 in an enlarged view.

The band sensor includes in a known manner a winding drum 2 on which a measuring band 4 is wound up in a single radial plane 11, thus with the particular winding layers of the measuring band 4 radially on top of one another. The free end of the measuring band 4 is attached to the piston 51, which is performed in the center of the piston 51 according to FIG. 2. The rotation axis 12 of the winding drum 2 is disposed in FIG. 2 transversal to the movement direction of the piston 51.

As typical, the winding drum 2 is preloaded into the windup direction through a preloading unit, thus in turn a flat spiral spring 9. A magnet 3a is coupled with the winding drum 3, so it is drivable in rotation, wherein the pole axis of the magnet 3a is disposed transversal to the rotation axis 3'. However, between the winding drum 2 and the magnet 3a, a magnet step down transmission 6 is disposed, wherein the multiple rotations of the winding drum for a full pullout of the measuring band 4 are stepped down to slightly less than one full revolution of the magnet 3a.

The rotation of the magnet 3a is detected by a rotation angle sensor 54, which is disposed outside of the pressure loaded inner cavity 52 and which includes a magnetic field sensitive angle sensor 20.

A spring step down transmission 7 can also be disposed between the winding drum 2 and the flat spiral spring 9 in order to also step down the spring 7 to a lower number of revolutions than the number of revolutions of the winding drum 2. The components of the spring step down transmission 7 received in the interior of the housing and of the magnet step down transmission 6 are thus identical.

FIG. 2 does not illustrate the wall portion of the piston accumulator 50 extending between the magnet 3a and the rotation angle sensor 54, in which wall portion a magnetic field permeable wall portion 50a has to be disposed. This can be an integral component of the wall of the container 50 or as illustrated in FIG. 1a, or it can be configured at a screw-in component, which is screwed into a threaded bore of the piston accumulator 50 at a respective location, and thus is demountable as described in more detail with reference to FIG. 6.

Contrary to the solution of FIG. 2, the magnet 3a can also be connected directly torque proof with the winding drum 2 without a magneto step down transmission, so that the scanning angle sensor 20 has to be an angle sensor which detects over more than one revolution.

Since the piston 51 in such a piston accumulator 50 is typically supported freely rotatable in the piston accumulator 50 about its movement direction 10, this has to be taken into consideration when disposing the band sensor 1.

For this purpose, FIG. 2 illustrates that the measurement band 4 is disposed in the center of the piston 51, thus rotatable about the longitudinal center axis 10' of the piston 51.

Thus, the rotation axis 12 of the windup drum 2 of the sensor 1 is also disposed transversal to the movement direction 10 of the piston 51 like in FEG. 1a, so that the measuring band 4 is pulled off directly in movement direction from the winding drum 2 without further deflection.

The magnet step down transmission 6 is thus disposed with its output shaft 13 also parallel to the movement direction 10 of the piston 51 in particular on its longitudinal axis 10' and supports the magnet 3a at its free end, wherein the magnet 3a is in turn positioned proximal to the interval of the piston accumulator 50 and is scanned by a rotation angle sensor 54 with an angle sensor 20 disposed outside of the inner cavity 52 or 52'.

FIGS. 2a and 2b differ in that FIG. 2a includes the magnet step sown transmission 6, a worm gear transmission, while FIG. 2b uses a bevel gear transmission at this location.

Figure 2C:
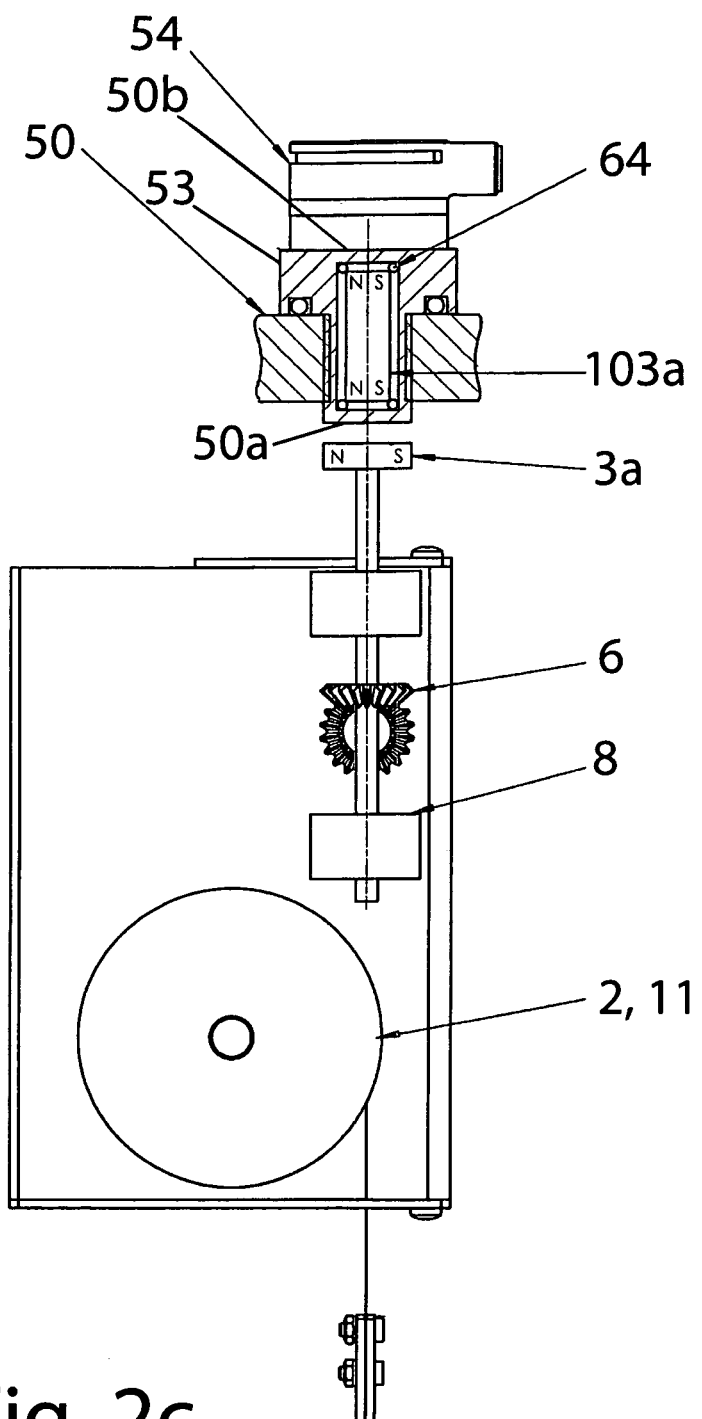
FIG. 2c illustrates a piston accumulator with a screw-in component.
Figure 3A:
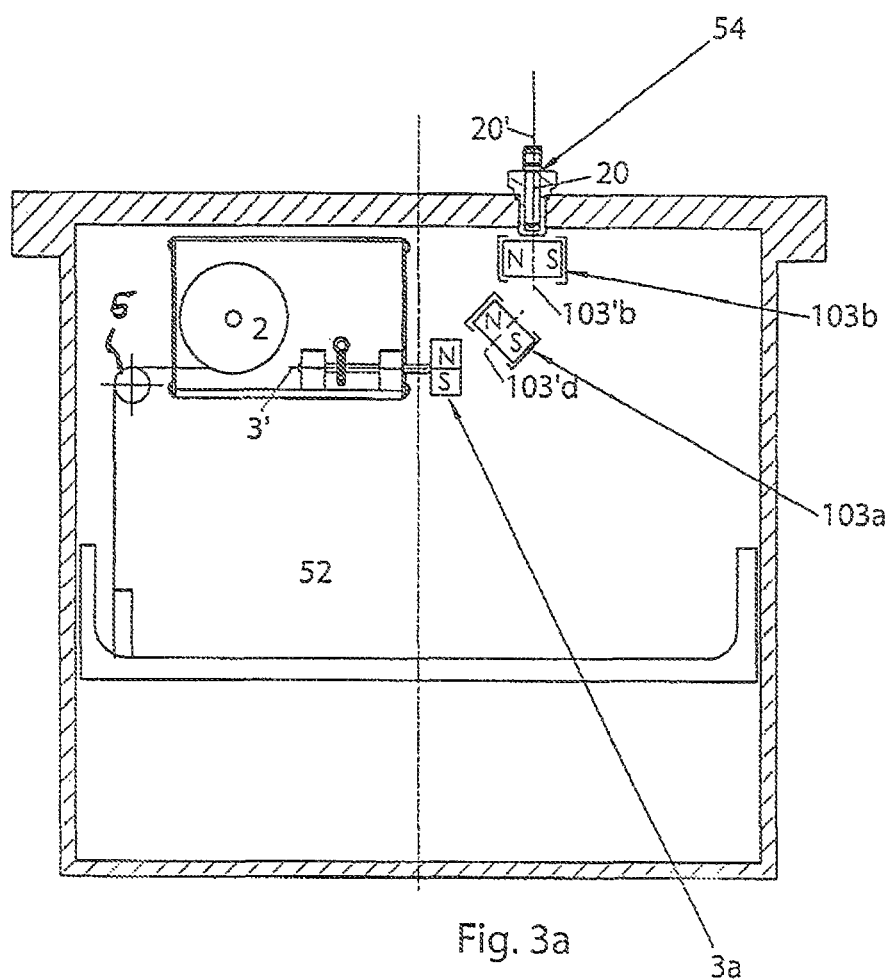
FIGS. 3a and 3b illustrate a solution with an intermediary magnet.
Figure 3B:
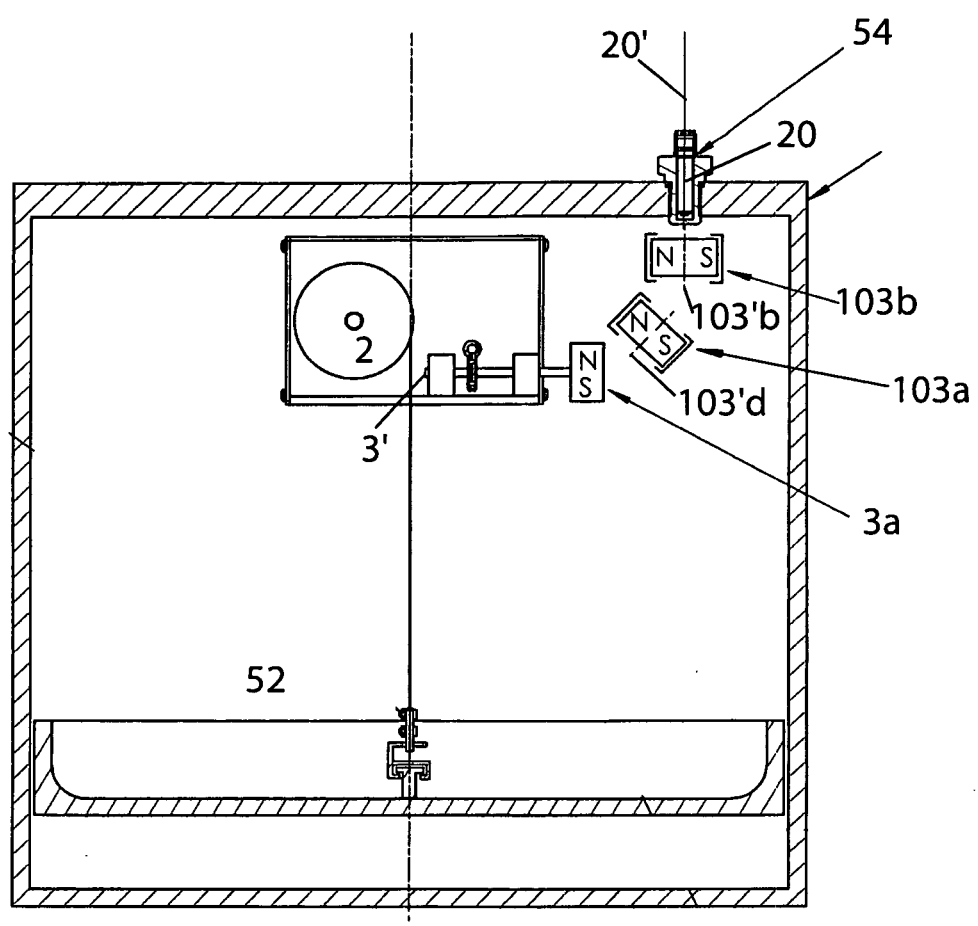

FIG. 3 differs from the solution in FIG. 2 in that the rotation axis 3' of the magnet 3a mechanically coupled to the winding drum 2 is not parallel or identical to the detection axis 20' of the angle sensor 20.

In order to compensate this, two intermediary magnets 103a, b are rotatably disposed between the magnet 3a and the angle sensor 20, thus still within the inner cavity 52.

Thus, the rotation axis 103'b of the second intermediary magnet 103b is identical with the detection axis 20' of the angle sensor 20 and the last intermediary magnet 103b is also disposed proximal to the magnetically permeable wall portion 50a towards the angle sensor 20.

The first encoder magnet 103a is disposed between the magnet 3a and the second encoder magnet 103b, thus with an alignment of its rotation axis 103'a in a center position between the rotation axis 3' of the magnet 3a and the rotation axis of the last intermediary magnet 103b.

This creates an intermediary angle of 45° respectively between the particular magnets, so that initially the first intermediary magnet 103a is co-rotated without any problem through the mechanically driven magnet 3a and in turn the intermediary magnet 103a synchronously rotates the next intermediary magnet 103b.

Figure 5:
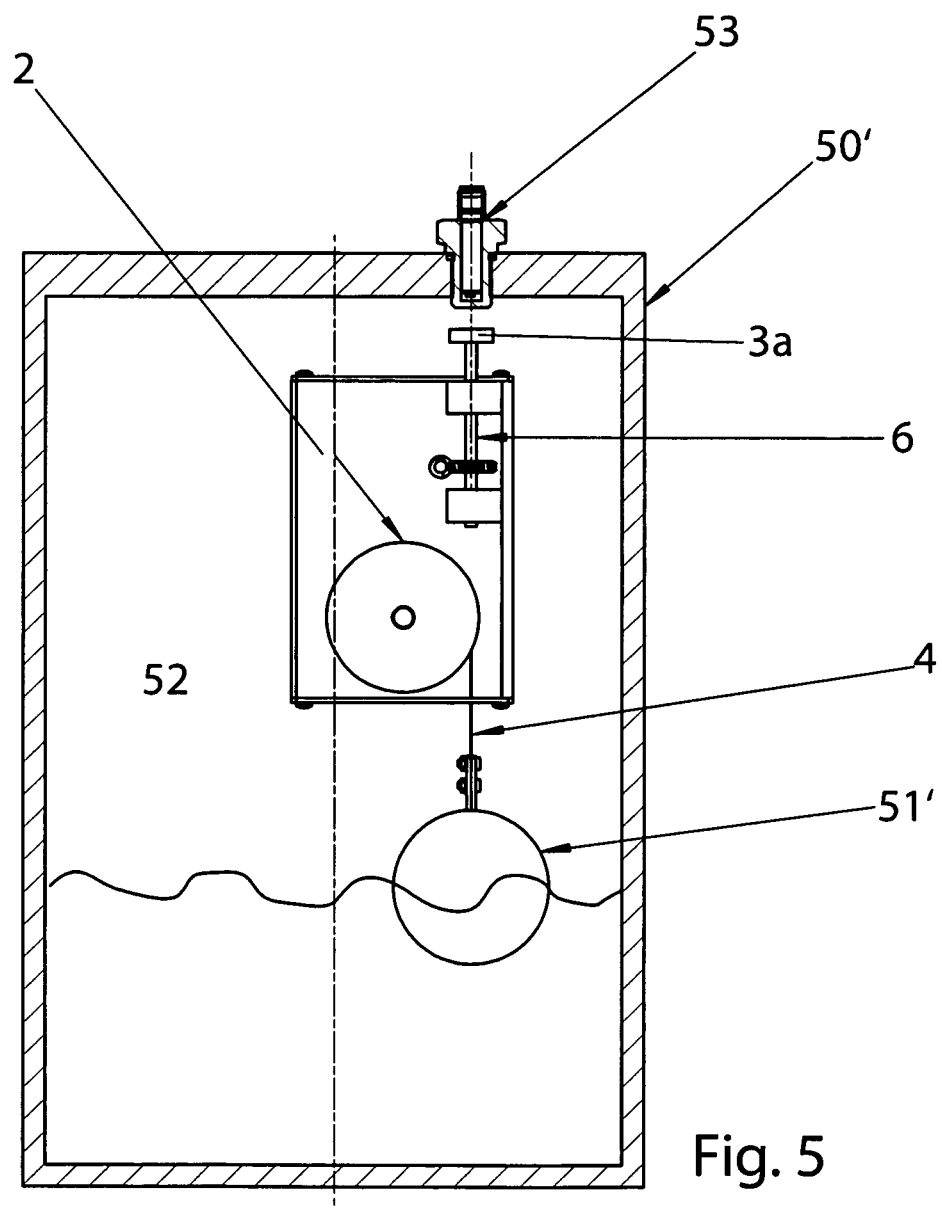
FIG. 5 illustrates a filling level monitoring system.

FIG. 5 illustrates the application of a band sensor 1 in the interior of a container 50' which is configured to receive a liquid or a bulk material and in which the filling level in the container 50 shall be detected at any time through a float 51' floating on the surface of the content, wherein the float is attached to the free end 4 of the band sensor 1.

Otherwise, this solution corresponds to the preceding solutions besides the fact that such a filling level sensor typically neither requires a rotatability of the float 51', nor its central disposition in the middle of the container 50.

FIGS. 6 through 9 illustrate the screw-in component 53 in detail also with respect to its disposition relative to the magnet 3a or 103a or 103b to be detected.

Figure 6:
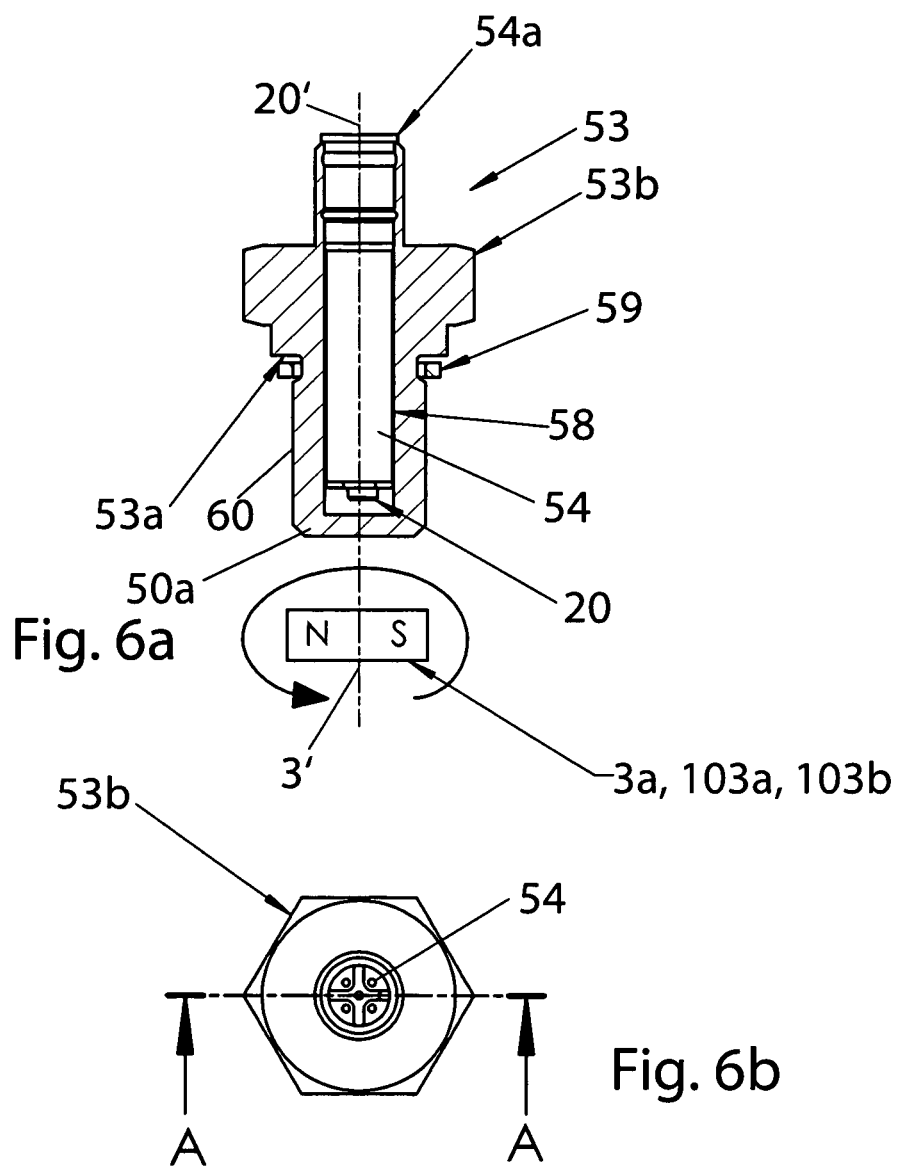
FIG. 6 illustrates a first embodiment of the screw-in component.

FIG. 6 illustrates a screw-in component of this type in detail, which is configured pot shaped with a center blind hole 58 which is accessible from the outside.

With respect to the outer contour the screw-in component 53 includes an outer hexagonal shape 53b in the center portion of its axial extension which is used for applying a tool, wherein a protrusion extends forward from the exterior hexagonal shape, wherein an external thread 60 is disposed at the outer circumference of the protrusion.

The exterior thread 60 is used for threading the screw-in component 53 into a respective pass through bore hole in the wall of the container 50' or the piston accumulator 50 and contacts the outer surface of the wall of the piston accumulator 50 or the -container in a tightly sealing manner with the shoulder 53a between the protrusion and the wider outer hexagonal shape 53b and a seal 59 disposed at this location in a respective groove.

The blind hole 58 extends shortly before the front face wall of the screw-in component 53, which is configured so that it functions as a magnetically permeable wall portion 50a.

Figure 4:
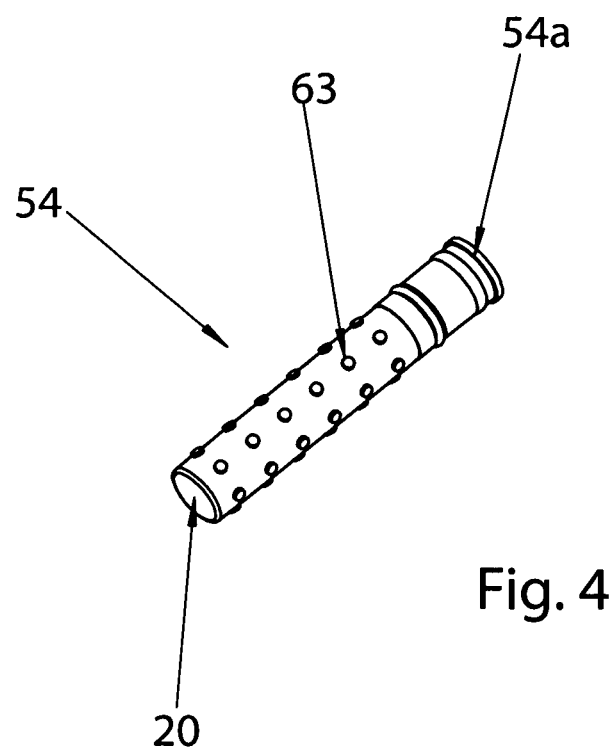
FIG. 4 illustrates a rotation angle sensor.

Thus, a rotation angle sensor 54 is inserted into the screw-in component 53 from its open back side, wherein the rotation angle sensor 54 is illustrated in an embodiment in FIG. 4 and the magnetic field sensitive angle sensor 20 is disposed at the front face of the rotation angle sensor 54.

The detection axis 20' about which the angle sensor 20 can detect the rotation position of an existing magnetic field is thus disposed perpendicular to the main plane of the flat angle sensor 20, and in particular perpendicular to its center orthogonal.

Since the rotation angle sensor 20 is disposed at the front face of the elongated cylindrical rotation angle sensor 54 the detection axis 10' simultaneously forms the longitudinal axis of the rotation angle sensor 54.

The rotation angle sensor 54 includes an outward protruding shoulder 54a at its rear end, wherein the outward protruding shoulder contacts the rear end of the screw-in component 53 in inserted condition and positions the rotation angle sensor 54 in its longitudinal direction, so that the angle sensor 20 received at the front face is disposed proximal to the end of the blind hole 58 and thus proximal to the wall portion 50a which is magnetically permeable.

In this case the magnet e.g. 3a is disposed with a rotation axis 3' coinciding with the detection axis 20 orthogonal to the surface of the angle sensor 20 configured as a chip and is also disposed proximal to the wall portion 50a.

Figure 7:
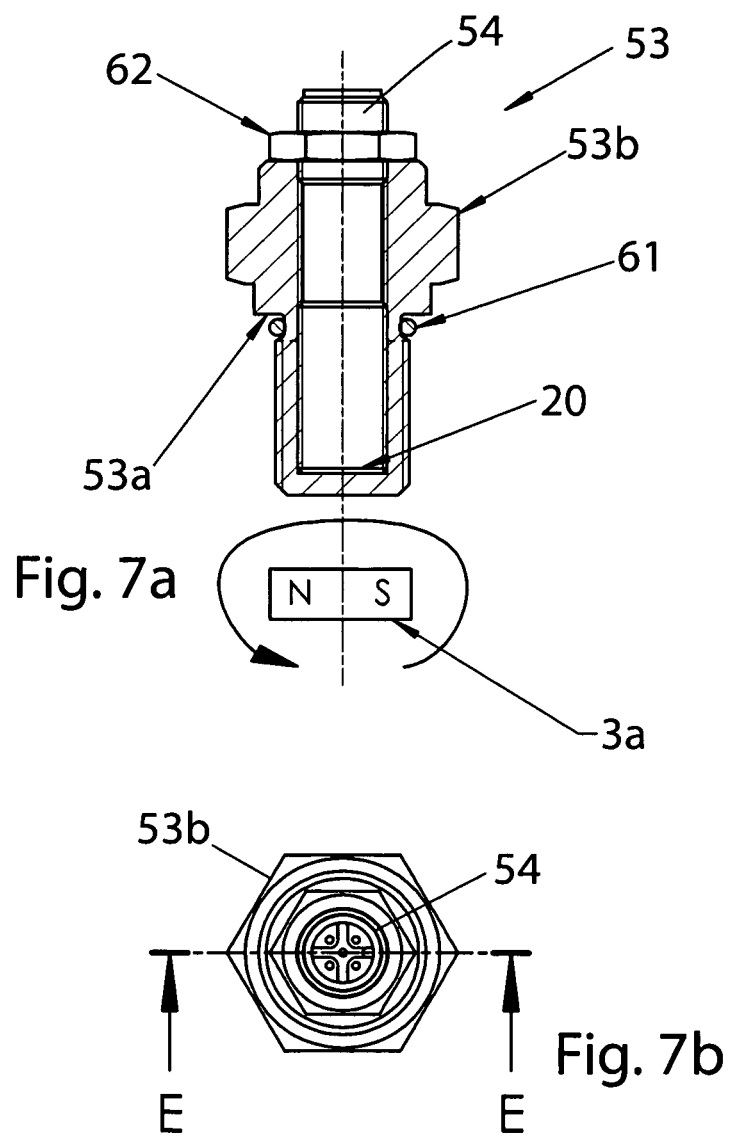
FIG. 7 illustrates a second embodiment of the screw-in component.

The solution according to FIG. 7 differs from the solution according to FIG. 6 on the one hand side in that the screw-in component 53 is sealed relative to the receiving wall through an O-Ring 61 configured as a seal ring.

Furthermore, the rotation angle sensor 54 is not simply inserted into the screw-in component 53, but additionally adjusted in longitudinal direction at this location through a nut 62 which can be screwed onto the outer circumference of the rotation angle sensor 52.

Figure 8:
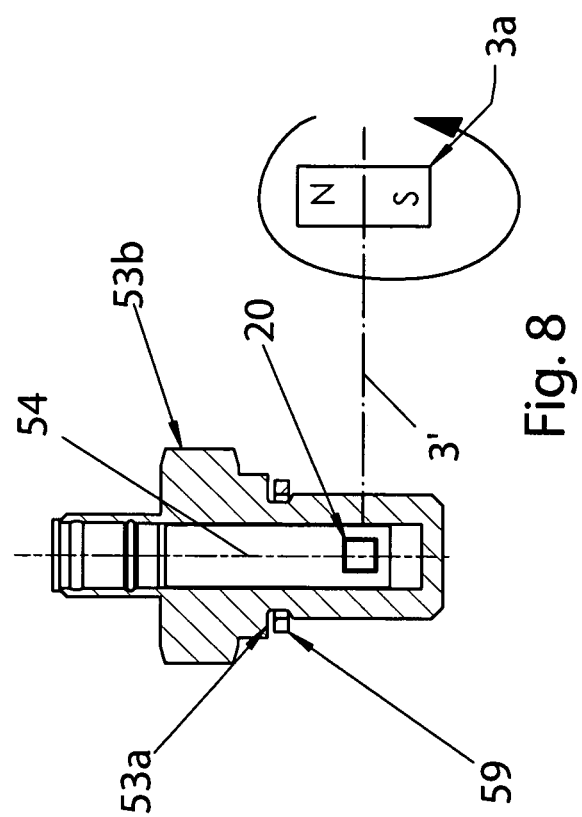
FIG. 8 illustrates a third embodiment of the screw-in component.

FIG. 8 illustrates a solution in which the screw-in component 53 and the rotation angle sensor 54 correspond to the solution in FIG. 6, however the chip of the angle sensor 20 is not disposed at the front face but laterally at a wall of the rotation angle sensor 54 and also the encoder magnet, e.g. 3a with its rotation axis 3' is disposed perpendicular to the surface of the angle sensor 20, thus however also perpendicular to the longitudinal extension of the rotation angle sensor 54.

FIG. 4 illustrates the rotation angle sensor 54 separately, wherein distributed protruding knobs 63 are visible at its outer enveloping surface which are preferably made from elastic material, so that the rotation angle sensor 54 in inserted condition only contacts the inner circumference of the blind hole 58 of the screw-in component 53 with these knobs.

Since the magnets 3a and 103a are disposed proximal to one another, a rotational driving of the intermediary magnet 103a through the mechanically driven magnet 3a is still provided.

The peculiarity with respect to the intermediary magnet 103a is furthermore comprised in that the magnet is not conventionally, thus mechanically supported as this can be the case e.g. in FIG. 3 for the intermediary magnets, but the magnet 103a is supported in a liquid in a relatively tightly enclosing cavity.

The cavity is filled with a so called Ferro-fluid, thus a liquid which includes ferromagnetic particles 64.

The particles accumulate at the surface of the magnet 103a and thus in turn preferably at its edges, so that a type of sliding layer is created through the accumulating ferromagnetic particles 64 between the magnet 103a and the surrounding screw-in component 53.

The faces of the screw-in component 53 are thus in turn configured as magnetically permeable wall portions 50a, b, so that the rotation angle sensor 54 disposed outside of the screw-in component 53, which is screwed into a accordingly configured thread in the face of the piston accumulator 50, can detect the rotation position of the magnet 103a through the angle sensor 20.

Figure 9A:
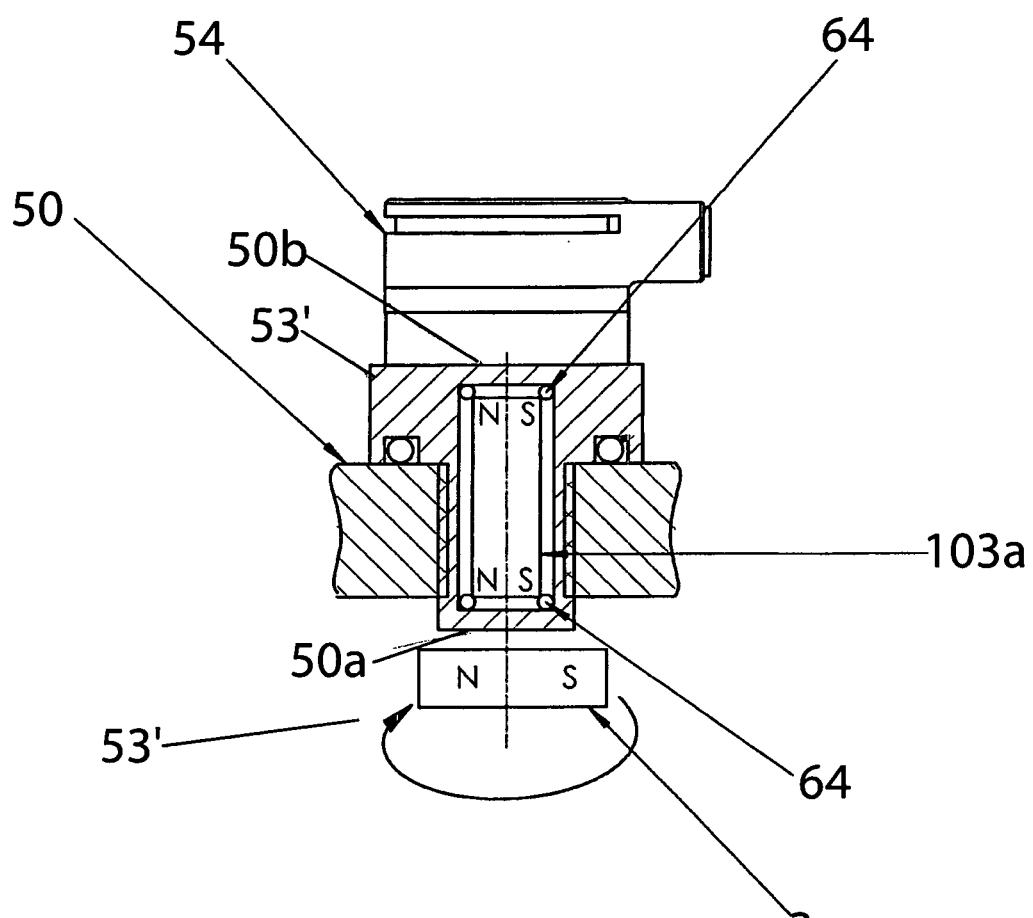
FIG. 9 illustrates the screw-in component with an enclosed intermediary magnet.
Figure 9B:
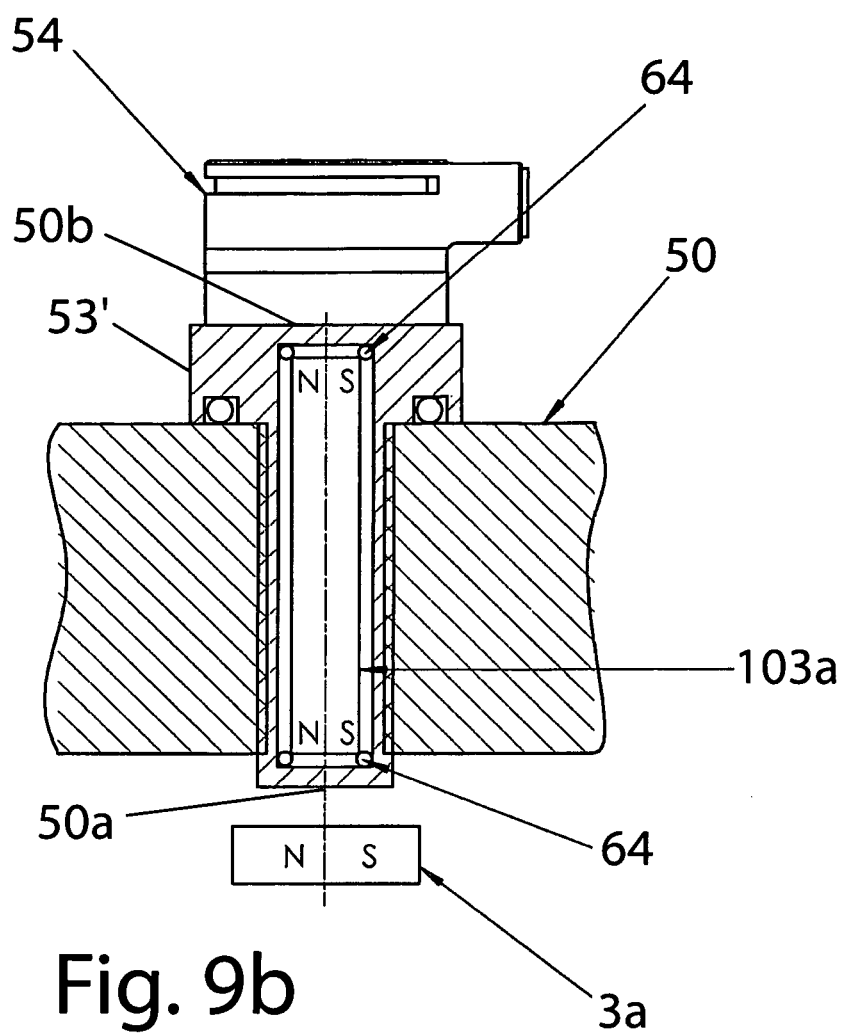

The FIGS. 9a, 9b illustrate another screw-in component 53' whose function is different.

The rotation angle sensor is not disposed in this screw-in component 53', but only an intermediary magnet whose pole axis is disposed transversal to the longitudinal axis of the hole in the screw-in component 53', which in this case is not a blind hole that is open towards the back, but a cavity 55 that is closed towards the back.

On the outward oriented backside of the screw-in component 53', any rotation angle sensor 54, in particular a rotation angle sensor that detects a plurality of revolutions, can be attached or can be integrally configured with the screw-in component 53'.

In order to permeate the thickness of the housing wall, e.g. of a pressure accumulator, the intermediary magnet 103*a* is preferably configured rod shaped with a longitudinal axis disposed transversal to the housing wall, and in particular so that the magnet reaches through the housing wall, wherein the pole axis of the magnet is disposed transversal to the longitudinal extension of the intermediary magnet 103*a*.

This way, also screw-in components 53' with different lengths and intermediary magnets 103*a* with different lengths, as evident from the comparison of FIGS. 9*a* and 9*b*, can permeate different wall thicknesses of the container 50.

Below the screw-in component 53', in turn, the magnet 3*a* is illustrated, which in turn rotates about the same rotation axis as the intermediary magnet 103*a*, wherein the magnet 3*a* is driven in rotation by the winding drum, which is not shown.

FIG. 2*c* illustrates an application of the screw-in component 53' with rotation angle sensor 54 at a pressure accumulator 50, according to FIG. 2*b*, instead of the screw-in component 53 at this location.

What is claimed is:

1. A method for using a band sensor (1) according to the measuring band principle with a measuring band (4) to be wound up on a winding drum in a radial plane (11) for defining a position of a component in an interior of a housing and with a preloading unit preloading a winding drum (2) in windup direction, whereby the component is coupled with the free end of the measuring band, comprising:
    at least one magnet (3*a*...) is rotationally coupled with the winding drum (2) of the band with sensor (1), so that the magnet is drivable by the winding drum (2) in rotation about a magnet rotation axis, wherein a pole axis of the magnet is disposed transversal to a magnet rotation axis;
    the band sensor (1) is disposed together with the magnet (3*a*...) inside of a magnetically permeable wall portion (50*a*) of the housing;
    a magnetic field sensitive sensor (20) detecting a rotation position of a magnet (3*a*) is disposed on an outside of the housing opposite to the magnet (3*a*); and
    numerically compensating for the measuring band length varying with the percentage of windup by processing electronics.

2. A method according to claim 1, wherein the housing is a piston accumulator (50) and the component whose position is determined is a piston (51) in the piston accumulator (50).

3. A method according to claim 2, wherein the measuring band (4) is attached in the center of the piston (51) and rotatable about the axis of the piston.

4. A method according to claim 2, wherein the drum is mounted with its rotation axis (12) transversal to a movement direction (10) of the piston (51) in the interior of the piston accumulator (50) on the side facing away from the piston (51).

5. A method according to claim 2, wherein the portion of the band sensor (1) disposed in the interior of a piston accumulator (50) includes a component having exclusively mechanical functions.

6. A method according to claim 1, wherein the component whose position is determined is a float (51), and the housing is a container (50') for a liquid or bulk material, on which the float (51) floats.

7. A method according to claim 1, wherein the magnet (3*a*) is connected to the winding drum (2) by means of a magnetic step down transmission (6) to transfer torque.

8. A method according to claim 1, wherein the preloading unit is connected to the winding drum (2) by means of a step down transmission (7) to transfer a torque, wherein the step down transmission comprises a spring.

9. A method according to claim 1, wherein a diameter of the winding drum (2) is sized so that it fits closely into the interior (52) of the housing when the winding drum is completely wound up.

10. A method according to claim 9, wherein the band sensor (1) is disposed in a pressure loaded portion of an inner cavity (52) of a container.

11. A method according to claim 1, wherein the band sensor (1) is disposed such that the rotation axis (12) of its winding drum (2) is disposed in parallel to a movement direction (10) and the measuring band (4) is deflected into the movement direction (10) of the piston (51) by means of at least one pulley (5).

12. A method according to claim 1, wherein the measuring band (4) is made from bare metal, thus without a coating.

13. A piston accumulator (50) comprising a piston (51) movable in longitudinal direction therein and a band sensor (1) according to the measuring band principle, wherein the measuring band sensor is mounted in the interior of the piston accumulator (50) at the end of the piston accumulator (50) distal from the piston (51), and wherein the free end of the measuring band (4) of the piston accumulator (50) is attached at the piston (51), comprising:
    at least one magnet (3*a*...) is coupled with a winding drum (2) of the band sensor (1), so that the magnet is drivable in rotation about a magnet rotation axis (103'), wherein a pole axis of the magnet is disposed transversal to the magnet rotation axis (103');
    the band sensor (1) is disposed together with the magnet (3*a*...) at the inside of a magnetically permeable wall portion (50*a*) of the piston accumulator 50;
    a magnetic field sensitive sensor (20) detecting a rotation position of a magnet (3*a*...) is disposed on the outside of the piston accumulator (50) opposite to the magnet (3*a*); and
    the measuring band length varying with the percentage of windup is numerically compensated by processing electronics.

14. A piston accumulator according to claim 13, wherein the band sensor (1) is mounted with its rotation axis (11') transverse to a movement direction (10) of the piston (51) in the interior of the piston accumulator (50) on the side facing away from the piston (51).

15. A piston accumulator according to claim 13, wherein the diameter of the winding drum (2) is sized, so that it fits closely into the interior (52) of the piston accumulator (50), when the winding drum is completely wound up.

16. A piston accumulator according to claim 15, wherein the band sensor (1) is disposed in the pressure loaded portion of the inner cavity (52) of the piston accumulator (50).

17. A piston accumulator (50) according to claim 13, wherein the band sensor (1) is disposed with its rotation axis (12) in parallel with a movement direction (10) and the measuring band (4) is deflected into the movement direction (10) of the piston (51) through at least one pulley (5).

18. A piston accumulator according to claim 13, wherein a spring step down reduction gear (7) and a magnetic step down reduction gear (6) are at least partially identical.

19. A piston accumulator according to claim 13, wherein the magnetically permeable wall portion (50a) is made from non-magnetic stainless steel or aluminum or brass and is made from the material, from which a head of the piston accumulator is made.

20. A piston accumulator according to claim 13, wherein the magnetically permeable wall portion (50a) is an integral component of the piston accumulator (50).

21. A piston accumulator according to claim 13, wherein the magnetically permeable wall portion (50a) is a portion of an installed component, which is inserted into the wall of the piston accumulator (50).

22. A piston accumulator according to claim 21, wherein the installed component is a screw-in component that is screwed into a bore hole in the wall of the piston accumulator (50).

23. A piston accumulator according to claim 22, wherein a blind bore hole is disposed in the screw-in component (53) in axial direction from the backside of the screw-in component and a pin shaped rotation angle sensor (54) is disposed in the blind bore hole, wherein the rotation angle sensor (54) supports a magnetic field sensitive angle sensor (20) at the front face of the rotation angle sensor (54).

24. A piston accumulator according to claim 13, wherein the magnetic field permeable wall portion (50a) has a surface area of less than 2cm$^2$, or less than 1cm$^2$.

25. A piston accumulator according to claim 13, wherein the rotation axes (3') of the magnet (3a) and the detection axis (20') of the magnetic field sensitive angle sensor (20) do not coincide, and do intersect at an angle of 90° relative to one another.

26. A piston accumulator according to claim 13, wherein one or plural intermediary magnets (103a . . . ) are disposed rotatable between the magnet (3a) and the angle sensor (20), wherein the rotation axes (103') of the intermediary magnets assume intermediary positions between the rotation axis (3') of the magnet (3a) and the rotation axis (20') of the angle sensor (20').

27. A piston accumulator according to claim 26, wherein the intermediary magnet (103a) is disposed in a cavity (55) in the wall of a container, wherein the cavity is at least partially filled with a liquid.

28. A piston accumulator according to claim 13, wherein:
the band sensor (1) is disposed eccentric to a longitudinal center axis (10) of the piston accumulator;
the rotation axis (3') of the magnet (3a) is disposed transversal to the movement direction (20) of the piston (51);
the magnet (3a) is disposed proximal to one of the walls of the piston accumulator (51);
an intermediary magnet (103a) is disposed proximal to the wall of the piston accumulator (50) or in the wall of the piston accumulator (50), wherein the rotation axis (103'a) of the intermediary magnet is disposed perpendicular to the rotation axis of the magnet (3a) and proximal to the magnet (3a);
the rotation axis (3') of a winding drum (2) is disposed transversal to the movement direction (10) of the piston (51); and
the measuring band (4) is deflected through a pulley (5) to the center of the piston (51).

29. A container (50') for a liquid or a bulk material, the container comprising:
a filling level measuring device including a float (51), which is attached at a band sensor (1) according to the measuring band principle, wherein the band sensor is disposed in the interior of the container (50'), wherein
at least one magnet (3a) is coupled with a winding drum (2) of the band with sensor (1), so that the magnet is drivable in rotation about a magnet rotation axis (103'), wherein a pole axis is disposed transversal to the magnet rotation axis (103');
the band sensor (1) is disposed together with the magnet (3a) at an inside of a magnetically permeable wall portion (50a) of the container) (50');
a magnetic field sensitive sensor detecting a rotation position of the magnet (3a) is disposed on the outside of the container (50') opposite to the magnet (3a), wherein
the measuring band length varying with the percentage of windup is numerically compensated by processing electronics.

* * * * *